United States Patent Office 3,421,000
Patented Jan. 7, 1969

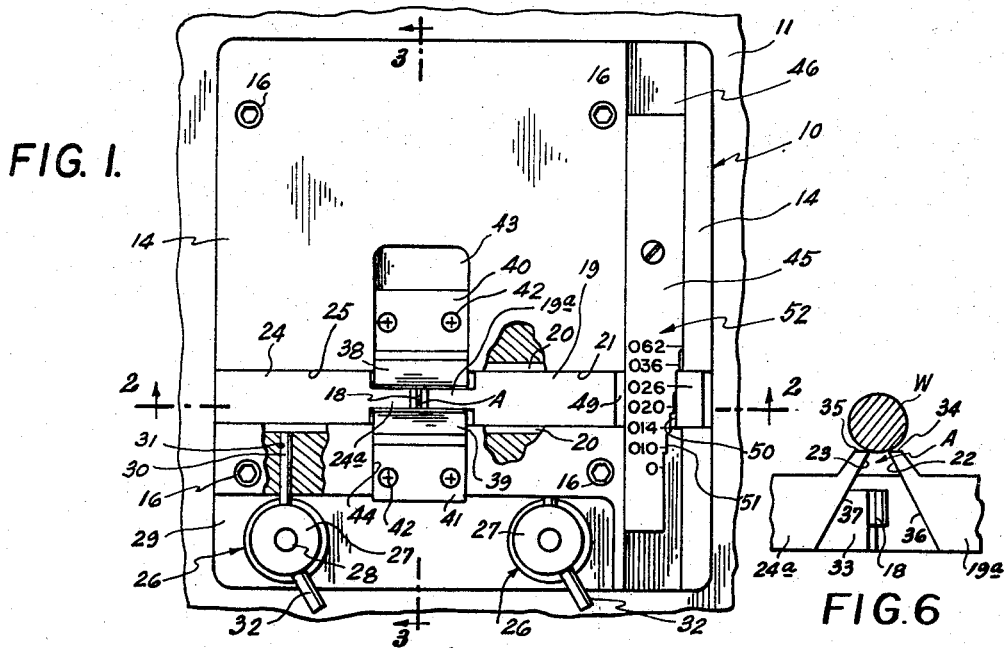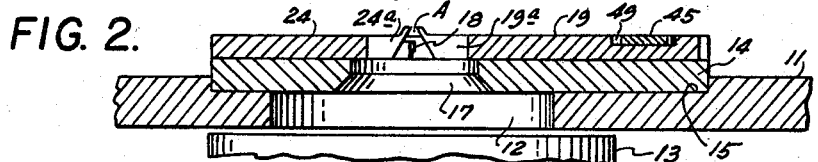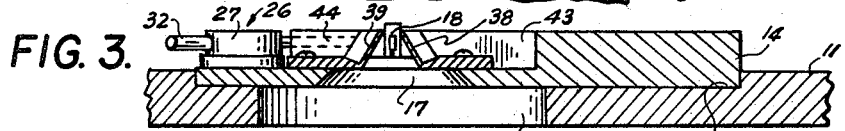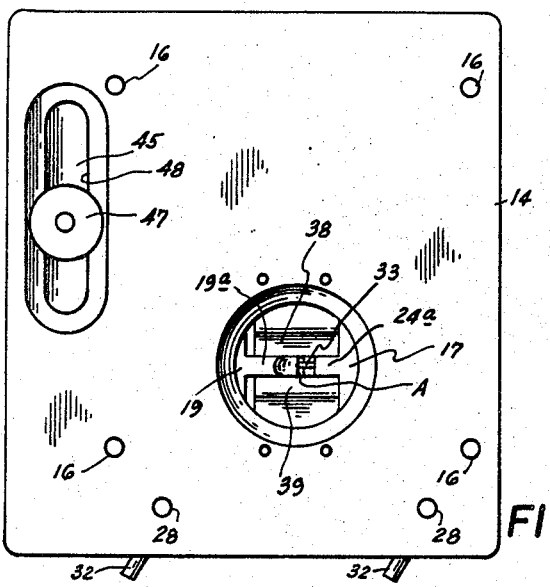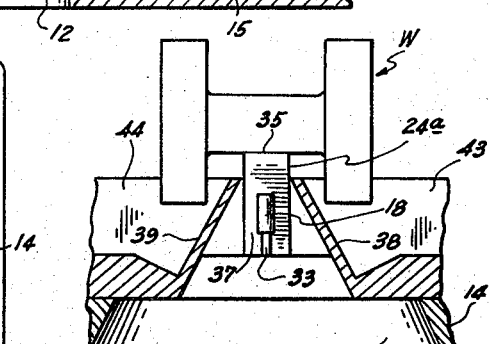

3,421,000
WORKPIECE SUPPORT AND MASK ASSEMBLIES FOR RADIATION BACKSCATTER MEASURING INSTRUMENTS
Sidney U. Lieber, Bayside, and William D. Hay, Peekskill, N.Y., assignors to Unit Process Assemblies, Inc., Woodside, N.Y., a corporation of New York
Filed Oct. 22, 1965, Ser. No. 502,015
U.S. Cl. 250—105    11 Claims
Int. Cl. H01j 1/52

This invention relates generally to instruments employing beta-radiation backscatter techniques for measuring the thicknesses of thin layers or coatings of one substance on a base material or substrate having a significantly different atomic number or for the sorting of different metals and alloys.

In instruments of the described type, radiation from a suitable beta-emitting isotope is directed against a surface of the workpiece or sample to be measured, and a detector, for example, a Geiger tube, picks up the backscatter, that is, the beta-radiation backscattered from the workpiece, and transmits corresponding signals to a suitable electronic system for interpretation anl translation into readings on a meter. The intensity of the backscatter of the beta-rays is proportional to the atomic number of the material at the surface of the workpiece against which the radiation is directed. Where the workpiece has a coating substance of an atomic number different than that of the base material, the intensity of the backscattered radiation is further proportional to the thickness of the coating.

Comparison of the values obtained by the above procedure with the values from known standards leads to quantitative measured results. Thus, through such comparative measurement techniques, the meter readings can be calibrated either to indicate the material forming the workpiece or to indicate the thicknesses of various coating substances on various base materials. Beta ray backscatter measuring instruments have particularly found application in the measurement of the thicknesses of thin precious metal deposits and other coatings on electronic components such as, for example, transistor leads and headers, connectors, the reeds or reed relays, coatings on printed circuit boards, and tantalum on glass supports in resistors or resistance elements and the like.

It has long been recognized that higher degrees of accuracy are achieved in the measurement of the thickness of a coating substance on a base material or substrate by exposing maximal amounts of the surface area to be measured to radiation for backscatter therefrom to the detector. However, if, for example, adjacent uncoated surfaces of the base material are also exposed to such radiation, the backscatter from such exposed surfaces of the base material will affect the accuracy of the thickness measurement.

The need for delineation of the area exposed to radiation has been accentuated by the continuous trend to miniaturization, particularly in the electronic field, as evidenced by the continual diminution in size of the objects or workpieces mentioned above as illustrative typical subjects for beta backscatter type measurement. Because of such diminution of workpiece size and because of the selective location of coatings over areas of varying size and shape thereon and the presentation of areas of varying curvature or shape for measurement, maintenance of a readily available widespread field of potential use for such beta ray instruments has required the use of multiplicities of apertured plates or masks having exposure openings therein of varying sizes and shapes. Apart from the cost inherent therein and the nuisance of stacking large numbers of aperture plates and making comparative selection therefrom, the continual varaitions introduced in workpiece configuration presents a continual demand for new and complementally designed aperture plates with an accompanying additional expense and unavoidable delay time for the required fabrication thereof.

Accordingly, it is an object of this invention to provide a workpiece support and mask assembly for a beta radiation backscatter measuring instrument which defines an exposure opening or aperture of conveniently variable size and/or shape so that the instrument can be expeditiously used for measurements on workpieces of widely varying size and shape.

Another object is to provide a workpiece support assembly defining a variably sized exposure opening, and which uniformly locates the exposed surface of the workpiece in relation to the radiation source for all settings of the opening.

In accordance with the broad aspects of this invention, a radiation backscatter measuring instrument is provided with a workpiece support and mask assembly which comprises a plate effectively permanently fixed to a support table and means on the plate denfining an exposure opening which opens through the plate and which includes at least one member movable parallel to the plane of the plate to vary the effective area of the opening, the means defining the variable opening having raised surfaces along edges of the opening for locating contact with the workpiece. Further, in accordance with the invention, a source holder assembly containing a beta ray emitting isotope is supported within the exposure opening by the means defining the latter so as to be always accurately located with respect to any workpiece contacted by the raised surfaces.

Still another object of this invention is to provide a workpiece support and masking assembly which defines an exposure opening of selectively variable size and/or area and which has gauging means thereon for accurately setting and indicating the size of the opening.

A further object is to provide a workpiece support assembly of the described character which is adapted to permit the measurement of the coating thicknesses or analysis of the materials of workpieces having widely varying configurations.

The above, and other objects, features and advantages of the invention, will be apparent in the following detailed description of illustrative embodiments thereof which is to be read in connection with the accompanying drawings, wherein:

FIG. 1 is a top plan view of a workpiece support and mask assembly for a radiation backscatter measuring instrument in accordance with this invention;

FIG. 2 is a transverse sectional view taken along the line 2—2 on FIG. 1;

FIG. 3 is a sectional view taken along the line 3—3 on FIG. 1;

FIG. 4 is a bottom plan view of the work support;

FIG. 5 is an enlarged fragmentary sectional view to illustrate details of the structure shown on FIG. 3; and FIG. 6 is an enlarged fragmentary sectional view to illustrate details of the structure shown on FIG. 2.

Referring to the drawing in detail, it will be seen that a workpiece support and mask assembly 10 embodying this invention may be advantageously employed as part of a radiation backscatter measuring instrument of the type that includes a support table 11 having an opening 12 in the table top and below which a detector 13, for example, a Geiger tube of pancake configuration, is suitably mounted.

The workpiece support assembly 10 embodying this invention comprises a plate 14 shaped to fit into a recess 15 formed in the upper surface of the table top around opening 12, and adapted to be secured thereto, as by screws 16 (FIGS. 1 and 4). Plate 14 has an opening 17 (FIGS. 2–5) extending therethrough and located so as to be centered with respect to the table opening 12 when plate 14 is secured in recess 15. Opening 17 may be circular, as shown on FIG. 4, and preferably has an undercut or beveled edge so as to minimize, if not avoid, interference with rays being backscattered from a workpiece W (FIG. 5) to the underlying detector.

In accordance with this invention, the workpiece support assembly 10 has means on its plate 14 defining an exposure opening A (FIGS. 1, 2 and 4) located above plate opening 17 and being of selectively variable size and/or shape so as to expose a suitable area of the workpiece W located above the opening A to radiation from a beta-emitting isotope contained in a source holder assembly 18 which is supported within the opening, as particularly shown on FIGS. 5 and 6. The means for defining the variable exposure opening A includes a member 19 movable parallel to the plane of plate 14 and which is shown in the form of a slide. Slide 19 is of dove-tail cross-section or has tongues 20 (FIG. 1) projecting from its opposite longitudinal edges and is rectilinarly movable along a groove 21 of mating cross-section formed in the top surface of plate 14 and opening, at one end, at the periphery of opening 17. Thus, the inner end portion 19a of slide 19, which is preferably of reduced width or lateral dimension, as shown on FIG. 1, can be made to project a variable distance over opening 17 so as to similarly adjust the position of its inner end edge 22 which defines one edge of opening A.

In the work holder 10, the edge 23 (FIG. 6) of opening A which is opposed to edge 22 is defined by the inner end edge of a second slide 24 which is removably received in a groove 25 of mating cross-section. The groove 25 is formed in the upper surface of plate 14 in longitudinal alignment with groove 21 and extends from opening 17 in the direction opposed to groove 21. Slide 24 is normally held fixed in groove 25 so that its inner end portion 24a, which is also of reduced width, will project from groove 25 a substantial distance over opening 17 to dispose its inner end edge 23 approximately above the center of opening 17. It will be apparent that, with slide 24 fixed in groove 25, rectilinear movement of slide 19 along groove 21 will serve to vary the distance across opening A between the opposed edges thereof defined by end edges 22 and 23 of slides 19 and 24.

Assembly 10 has a locking device 26 (FIGS. 1 and 3) associated with each of the slides 19 and 24 for holding the latter at fixed positions within the related grooves 21 and 25. As shown, each of the locking devices 26 may include a cam 27 eccentrically rotatable on a pin 28 projecting from a relatively thin edge portion 29 of plate 14. The cam 27 peripherally engages the outer end of a locking pin 30 which is slidable axially in a bore 31 opening, at its opposite ends, above edge portion 29 and into a side of the related groove 21 or 25. The pin 30 is longitudinally dimensioned so that, when cam 27 is turned to a position where its eccentricity extends toward the slide 19 or 24, pin 30 is urged by the cam axially against the slide so as to lock the latter in its groove. However, when cam 27 is turned from the foregoing locking position, pin 30 releases the related slide 19 or 24 to permit longitudinal displacement of the latter within its guide groove. Each cam 27 may have a handle 32 extending radially therefrom to facilitate its manipulation.

In accordance with this invention, the source holder assembly 18 containing the beta ray radiation source is supported within the opening A by the means defining such opening. As shown particulary on FIG. 6, the support for the source holder assembly 18 may be constituted by an arm or post 33 projecting from the inner end of slide 24 and having the member 18 preferably cemented or otherwise permanently secured thereon. Thus, if it is desired to change the source of radiation, for example, when a different isotope is required, the slide 24 can be conveniently removed and replaced by a similar slide carrying a holder which contains the desired source of radiation. Alternatively, however, the source assembly could be removably mounted for selective replacement, if desired.

The slides 19 and 24 further preferably have raised surfaces 34 and 35 (FIG. 6) extending along the edges 22 and 23 to engage and accurately locate the workpiece W with respect to the source assembly 18 containing the isotope source of beta radiation. As shown, the inner or confronting ends of slides 19 and 24 are preferably undercut or downwardly beveled, as at 36 and 37 (FIG. 6), so as to minimize, if not entirely avoid, interference with the backscattered beta rays from the surface of the workpiece exposed at opening A to the underlying detector.

The opposite ends of opening A are defined by walls 38 and 39 which can be vertical or inclined from the vertical, as shown, and which extend upwardly from the ends of mounting members 40 and 41 so as to lie closely adjacent to the opposite sides of the inner end portions 19a and 24a of slides 19 and 24. The mounting members 40 and 41 are secured, as by screws 42, at the bottoms of recesses 43 and 44 which are formed in the upper surface of plate 14 and extend to opening 17 at the opposite sides of the latter. By reason of the recesses 43 and 44 adjacent the ends of opening A, work support 10 embodying this invention can be used in connection with work pieces having widely varying configurations. Thus, as shown on FIG. 5, the work piece W may be in the form of a stepped cylinder having a relatively small diameter central portion engaged by the raised surfaces 34 and 35 of slides 19 and 24 so that the thickness of a layer or coating on that portion may be measured, while relatively large diameter end portions of the work piece overhang into the recesses 43 and 44. The inclined dispositions of walls 38 and 39 defining the ends of opening A ensure that such walls will not interfere with the backscatter of rays from the workpiece to the underlying detector.

In accordance with this invention, the work piece support and mask assembly 10 further has means engageable with the slide 19 to selectively limit the rectilinear movement thereof in the direction for decreasing the distance between the edges 22 and 23 at a plurality of positions corresponding to predetermined distances across the opening. In the illustrated work support 10, such means for selectively limiting the movement of slide 19 at a plurality of positions is constituted by a gauging member 45 (FIGS. 1, 2 and 4) shown in the form of an elongated slide movable longitudinally in a groove 46 provided in the top surface of plate 14 and extending at right angles to, and intersecting the groove 21. The groove 46 is of smaller depth than the groove 21, and the gauging member 45 is retained in groove 46 by means of a pin 47 (FIG. 4) extending from gauging member 45 through an undercut, elongagted slot 48 and having an enlarged head, at its lower end, engaging in the undercut portion of the groove. Further, slide 19 has a recess or groove 49 (FIGS. 1 and 2) extending laterally across its top surface so that gauging member 45 can project across slide 19 in such groove 49 of the latter. The groove 49 defines an abutment surface 50 (FIG. 1) at the wall or side surface of the lateral groove closest to the outer end of slide 19, and the gauging member 45 has one of its longitudinal edges stepped, as at 51, so that the several steps of that edge define gauging surfaces that are selectively engageable with the abutment surface 50. As shown on FIG. 1, indicia 52 may be provided on gauging member 45 to indicate the width of the opening A that is achieved when the respective gauging surfaces are contacted with the abutment surface 50.

In using the work piece support assembly 10 embodying this invention, slide 24 is unlocked and gauging member 45 may be initially disposed so that its gauging surface corresponding to a zero width of the opening A is positioned for engagement by the abutment surface 50 of slide 19. With the abutment surface 50 tightly engaged against such gauging surface of member 45, the locking device 26 associated with slide 19 is locked and the slide 24 is then moved inwardly to effect contact engagement of its inner end edge 23 with the inner end edge 22 of slide 19, whereupon the locking device 26 associated with slide 24 is manipulated to secure slide 24 in such adjusted position. After such initial adjustment of the position of slide 24 for the purpose of accommodating any wear that may have occurred at the edges 22 and 23, lock 26 for slide 19 is unlocked and gauging member 45 is displaced to position the gauging surface thereof corresponding to the desired width of opening A for engagement by the abutment surface 50. When abutment surface 50 is pressed against the selected gauging surface of member 45, and slide 19 is locked in such adjusted position by the associated locking device 26, the desired width or distance across opening A between edges 22 and 23 is positively attained. Thus, the width of opening A can be adjusted as required by the configuration of the work piece or by the area of the latter to be exposed to radiation, and such adjustment does not require the removal of any of the parts of work support 10 from the plate 14 permanently secured to the work table 11.

Although an illustrative embodiment of the invention has been described in detail herein with reference to the accompanying drawing, it is to be understood that the invention is not limited to that precise embodiment, and that various changes and modifications may be effected therein by one skilled in the art without departing from the scope or spirit of the invention, except as defined in the appended claims.

What is claimed is:

1. In a radiation backscatter measuring instrument, the combination of a workpiece support and mask assembly comprising a plate and means on said plate defining an exposure opening which opens through the plate and which includes at lease one member movable parallel to the plane of the plate to vary the effective area of said opening, said means defining the opening having raised surfaces along edges of said opening to engage and accurately locate a work piece at one side of said plate, and a holder containing a source of radiation supported within said opening by said means defining the opening to direct radiation toward said one side of the plate for impingement against a workpiece located by said raised surfaces and exposed to the radiation at said opening and a detector disposed at the other side of said plate for reception of radiation backscattered from said workpiece through said opening.

2. In a radiation backscatter measuring instrument, the combination according to claim 1; further comprising means mounted on said plate and engageable with said member to selectively limit the movement thereof at a plurality of predetermined positions corresponding to certain dimensions of said exposure opening.

3. In a radiation backscatter measuring instrument, the combination according to claim 1; wherein said member is in the form of a rectilinearly movable slide which, at one end, defines one edge of said exposure opening so that movement of said slide varies the distance across said opening between said one edge and the opposite edge thereof.

4. In a radiation backscatter measuring instrument, the combination according to claim 3; further comprising means mounted on said plate and engageable with said slide to selectively limit the rectilinear movement thereof in the direction decreasing said distance across the exposure opening at a plurality of positions corresponding to predetermined distances across the opening.

5. In a radiation backscatter measuring instrument, the combination according to claim 4; wherein said slide has an abutment surface extending thereacross, and said means to limit the movement of the slide includes a gauging member mounted on said plate for movement at right angles to said slide and having a stepped edge defining a series of gauging surfaces selectively engageable with said abutment surface and corresponding to said plurality of positions of the slide.

6. In a radiation backscatter measuring instrument, the combination according to claim 5; wherein said means defining an exposure opening includes a second slide movable rectilinearly on said plate in longitudinal alignment with the first mentioned slide and defining said opposite edge of the opening at the end of said second slide directed toward said first slide; and wherein one of said gauging surfaces corresponds to a zero distance across the opening so that, with said one gauging surface engaged with said abutment surface, said second slide can be moved to contact said end thereof with said one end of the first slide and thereby ensure that the distances across the opening will thereafter accurately correspond to the selected positions of said first slide irrespective of manufacturing tolerances and wear.

7. In a radiation backscatter measuring instrument, the combination according to claim 6; further comprising releasable locking means for holding each of said first and second slides at any selected positions thereof on said plate.

8. In a radiation backscatter measuring instrument, the combination according to claim 3; wherein said means defining an exposure opening includes a second slide on said plate in longitudinal alignment with the first mentioned slide and defining said opposite edge of the opening at the end of said second slide directed toward said first slide, and said holder containing a source of radiation is mounted on one of said first and second slides adjacent the end of the slide defining an edge of the opening.

9. In a radiation backscatter measuring instrument, the combination according to claim 3; wherein said means defining an exposure opening has a recess of substantial depth opening at said one side of the plate adjacent at least one end of said opening so as to permit a workpiece engaging said raised surfaces to overhang into said recess.

10. In a radiation backscatter measuring instrument, a workpiece support and mask assembly comprising a plate having an opening extending therethrough and longitudinally aligned guide grooves extending in opposite direction from said opening in one surface of said plate, slides movable longitudinally in said guide grooves so as to variably project their confronting ends over said opening for defining opposed edges of an exposure aperture, said slides having raised surfaces along said edges of the aperture to engage and accurately locate a workpiece, said plate having recesses in said surface at opposite sides of said guide grooves and walls between said recesses and said opening extending close to the adjacent sides of said slides for defining the ends of said apertures, locking means for releasably holding said slides against movement in said guides, and means carried by said plate and engageable with one of said slides to selectively limit the movement of said one slide at a plurality of positions corresponding to predetermined distances between said opposed edges of the aperture.

11. In a radiation backscatter measuring instrument, a workpiece support and mask assembly according to claim 10; wherein said one slide has an abutment surface extending thereacross, and said means to limit the movement of said one slide includes a gauging member mounted on said plate to move at right angles to the movement of said one slide and having a stepped edge defining a series of gauging surfaces selectively engageable with said abutment surface.

References Cited

UNITED STATES PATENTS

| | | | |
|---|---|---|---|
| 2,474,422 | 6/1949 | Hollstein | 250—105 |
| 2,964,631 | 12/1960 | Foster | 250—83.3 |

RALPH G. NILSON, *Primary Examiner.*

A. L. BIRCH, *Assistant Examiner.*

U.S. Cl. XR

250—83.3